United States Patent Office 3,127,312
Patented Mar. 31, 1964

3,127,312
FUMIGANT-EXTENDED POLYURETHANE FOAMS AND THE PROCESS OF MAKING
Jackson S. Boyer, Ridley Park, Pa., assignor to Sun Oil Company, Philadelphia, Pa., a corporation of New Jersey
No Drawing. Filed Aug. 17, 1961, Ser. No. 132,004
6 Claims. (Cl. 167—42)

This invention relates to a polyurethane foam extended with a fumigant.

The clothes moth, *Tineola biselliella* and *Tinea pelloniella*, has been repelled from fabrics by the use of such materials as naphthalene and paradichlorobenzene which sublime readily at ambient temperature.

I have found that the fumigant can be used to extend polyurethane foam. Extended foams differ from impregnated foams in that impregnants are added after the foam is formed. Extenders are added before the foam is formed. I have also found that the fumigant sublimes more slowly from an extended foam than it does from an impregnated foam and thus has a longer active effect. It is therefore the object of this invention to provide a fumigant-extended polyurethane foam which has slow vapor release properties.

According to the invention the fumigant is mixed with the foam ingredients before the foam is formed.

Polyurethane foams are made by reacting a di-isocyanate with one or more polyols and water. The di-isocyanate serves to join polyol molecules together, converting these liquid, low-molecular-weight polymers into very high-molecular-weight rubbery or rigid polymers. The final properties depend on the choice of polyol. For example, linear polyesters give rubbery polymers (flexible foams) and highly branched polyesters give hard, inelastic polymers (rigid foams). Any degree of cross-linking may be obtained in the final polymer by using polyesters having different degrees of branching. Water reacts with the di-isocyanate to provide gas for foaming. In another well-known method of foaming, a blowing agent such as a halohydrocarbon is used instead of water.

A variety of organic polyisocyanates can be employed in producing the fumigant-extended foams of the invention, although aromatic di-isocyanates are generally used. Di-isocyanates include 2,4- and 2,6-toluene di-isocyanates and mixtures thereof; 1,4- and 1,5-naphthalene di-isocyanate; phenyl di-isocyanates such as 4-4'-di-phenyl-methane, p-dixylylmethane-4,4'-di-isocyanate; and tri-ixocyanates such as diphenyl-4,6,4'-tri-isocyanate. Side chain di-isocyanates like naphthylylene and xylylene di-isocyanates can be used.

Polyols having a molecular weight ranging from about 500 to about 10,000 are used as sources of active hydrogen. These include polyester amides, polyesters, polyethers, and polyglycol ethers. Examples are polyoxyalkylene glycols, sorbitol polyethers, polyisocyanate-modified polyoxyalkylene glycols, castor oil, hydrogenated castor oil, and blown soya oil. Desirable polyesters include the adipates, succinates, sebacates, and azelates of ethylene and propylene glycols formed by reaction with the appropriate acids. As mentioned above, linear polyesters produce soft foams; and branched polyesters produce hard foams while polyester blends provide various degrees of cross-linking.

It is the usual practice to employ a catalyst. Compounds such as bismuth nitrate, lead 2-ethylhexoate, lead benzoate, lead oleate, sodium trichlorophenate, tetrabutyl titanate, ferric chloride, stannous octoate, stannous oleate, butyltin trichloride, and tertiary amines such as triethylene diamine are suitable catalysts. The preferred catalyst is triethylene diamine.

An emulsifier or other surfactant is often added to the reaction mixture to enhance foaming. Examples are polyethylene glycol ricinoleate, sorbitan monolaurate, and sodium dioctyl sulfo succinate. Silicone oils such as polyoxy-alkylene-polysiloxane copolymers can be used as well.

Suitable fumigants are those which sublime at room temperature, are soluble in the polyol or prepolymer, are compatible with the other ingredients, and do not interfere with the foaming reaction. Examples are naphthalene, paradichlorobenzene, hexachloroethane, and camphor. Of these, naphthalene and paradichlorobenzene are preferred. From about 5 to about 50 weight percent fumigant can be used based on the weight of the total foam ingredients. The preferred range is from 5 to 20 weight percent fumigant.

The foam may be prepared by batch, semi-continuous or continuous methods using bench equipment, or commercial foam machines. In one method of processing, the fumigant and the polyol are mixed to form a first component. The catalyst, emulsifier, and water are mixed to form a second component. The two components are mixed together, and the di-isocyanate is added, and the entire mixture is placed in the mold. Foaming begins immediately and proceeds without further treatment. The foam is allowed to cure for a time ranging from 10 minutes to several hours. In another method of processing, the polyol and the di-isocyanate are reacted to form a prepolymer, and the latter is mixed with the fumigant to form the first component. The second component is made by mixing additional polyol, the catalyst, the emulsifier, and a halohydrocarbon blowing agent such as $CCl_3F$, $CCl_2F$—$CCl_2F$, or $C_2Cl_2F_3$. When the two components are mixed together, foaming begins and proceeds without further treatment.

Pressures ranging from 0.1 to 10 atmospheres and temperatures ranging from 40 to 200° F. may be used in the foaming step.

The following examples illustrate two embodiments of the invention, but the invention is not to be considered limited thereto.

*Example I*

In formulating the first component, 10 parts of naphthalene were mixed with 42.6 parts of a prepolymer of polyether "G-2410" and toluene di-isocyanate. Polyether "G-2410" (Atlas Powder Company) is a condensation product of sorbitol with propylene oxide having the following approximate properties: Hydroxyl No. 490, approximate viscosity—10,000 (Hoeppler), theoretical molecular weight—760, and acid No. 0.30. The prepolymer is made by mixing 114.5 parts of polyether with 391.5 parts of 80–20 TDI (toluene di-isocyanate). The second component was made by mixing 0.45 part of surfactant—silicone oil "L-520" (Union Carbide), 8.5 parts of catalyst—triethylene diamine ("Dabco," Houdry Process Corporation), 15.3 parts of blowing agent—trichloromonofluoromethane, and 28.13 parts of polyether "G-2410." The first and second components were mixed 10 seconds, and foaming began immediately. A deep foam block was formed which was cured at ambient temperature (about 75° F.) for 30 minutes.

For the purpose of making a comparison of the fumigant release properties of extended and impregnated foams, an impregnated sample was made by soaking a test block of plain polyurethane foam in naphthalene for 8 hours. The foam was made in the same way and with the same ingredients as the extended foam. Odor tests showed that the naphthalene sublimed from the impregnated foam at a much faster rate than it did from the extended foam. Tests were made each day over a six-week period. After six weeks the impregnated foam had no naphthalene odor. The naphthalene-extended foam not only had a distinct odor, but the concentration of naphthalene subliming could be increased by scratching the surface of the foam or by indenting the surface of the foam by pressing with the fingers. This clearly indicates that the cells of the extended foam contained naphthalene.

*Example II*

A flexible urethane foam extended with naphthalene was made as follows: 100 ml. of naphthalene was dissolved in 100 ml. of triol polypropylene glycol ("Voranol CP-3001," Dow Chemical Company). To this mixture a blend of 3.5 g. of distilled water, 1.0 g. of silicone "L-520" (Union Carbide), 0.2 g. of triethylene diamine, and 0.2 g. of stannous octoate were added with stirring. Finally, 40 ml. of toluene di-isocyanate was added, and foaming began immediately. A deep flexible foam block was formed which had naphthalene trapped in the cells. The sublimation of naphthalene could be increased by squeezing the foam.

Similar results are obtained with paradichlorobenzene-extended foams.

The fumigant-extended foams of the present invention can be molded or cut in shapes for use in closets, chests, and other storage areas. The flexible extended foams are particularly suitable for rug underlay, furniture, and other places where the fumigant can be released by squeezing during ordinary use.

It is within the scope of this disclosure to modify the fumigant-extended foam with fillers, fire retardants, antioxidants, stabilizers, and dyes.

I claim:

1. A polyurethane foam extended with from 5 to 50 weight percent of a fumigant selected from the group consisting of naphthalene, paradichlorobenzene, hexachloroethane and camphor.

2. A polyurethane foam extended with from 5 to 50 weight percent naphthalene.

3. A polyurethane foam extended with from 5 to 50 weight percent paradichlorobenzene.

4. A process for the production of an extended polyurethane foam comprising the steps of forming a first component by blending a fumigant selected from the group consisting of naphthalene, paradichlorobenzene, hexachloroethane and camphor with a preformed reaction product of a polyol and toluene di-isocyanate; forming a second component containing additional polyol, an emulsifier, a tertiary amine catalyst, and a liquefied halohydrocarbon blowing agent; mixing the first and second components; and foaming the mixture.

5. A process for the production of an extended polyurethane foam comprising the steps of forming a first component by blending a fumigant selected from the group consisting of naphthalene, paradichlorobenzene, hexachloroethane and camphor with a polyglycol ether; forming a second component containing water, an emulsifier, and a catalyst; blending the first and second components and an aromatic di-isocyanate; and recovering the foam reaction product.

6. A process for the production of a fumigant extended polyurethane foam comprising the steps of reacting an aromatic diisocyanate with a liquid polyol having a molecular weight ranging from about 500 to about 10,000 and a fumigant selected from the group consisting of naphthalene, paradichlorobenzene, hexachloroethane and camphor in the presence of a blowing agent.

References Cited in the file of this patent

UNITED STATES PATENTS

| | | |
|---|---|---|
| 2,440,781 | Murray | May 4, 1948 |
| 2,861,965 | Roncoroni | Nov. 25, 1958 |
| 2,916,855 | Thiegs | Dec. 15, 1959 |
| 2,966,440 | Gerolt | Dec. 27, 1960 |
| 3,006,870 | Steinfatt et al. | Oct. 31, 1961 |

FOREIGN PATENTS

| | | |
|---|---|---|
| 721,896 | Great Britain | Jan. 12, 1955 |